United States Patent [19]
Hattori et al.

[11] Patent Number: 5,561,201
[45] Date of Patent: Oct. 1, 1996

[54] MOLECULAR COMPOSITE MATERIAL INCLUDING AROMATIC POLYTHIAZOLE AND METHOD OF PRODUCING SAME

[75] Inventors: Tatsuya Hattori, Tokyo; Kazuhiro Kagawa, Asaka, both of Japan

[73] Assignee: Honda Giken Kogyo Kabushiki Kaisha, Tokyo, Japan

[21] Appl. No.: 213,071

[22] Filed: Mar. 15, 1994

[30] Foreign Application Priority Data

Mar. 17, 1993 [JP] Japan .................................. 5-082647
Sep. 30, 1993 [JP] Japan .................................. 5-267927

[51] Int. Cl.$^6$ ............................ C08L 79/08; C08G 75/32
[52] U.S. Cl. ............................ 525/436; 525/420; 525/432
[58] Field of Search ................................ 525/417, 410, 525/432, 420, 436

[56] References Cited

U.S. PATENT DOCUMENTS

| | | | |
|---|---|---|---|
| 4,108,835 | 8/1978 | Arnold et al. | 528/183 |
| 5,068,292 | 11/1991 | Lenke et al. | 525/509 |
| 5,151,472 | 9/1992 | Valia | 525/432 |
| 5,159,029 | 10/1992 | Pater et al. | 525/421 |
| 5,223,588 | 6/1993 | Lenke et al. | 525/509 |
| 5,248,759 | 9/1993 | Akita et al. | 528/337 |
| 5,288,842 | 2/1994 | Feger et al. | 528/335 |

FOREIGN PATENT DOCUMENTS

| | | |
|---|---|---|
| 64-1760 | 1/1989 | Japan . |
| 64-1761 | 1/1989 | Japan . |
| 1-287167 | 11/1989 | Japan . |
| 2-7976 | 2/1990 | Japan . |
| 4-114062 | 4/1992 | Japan . |

*Primary Examiner*—Ana L. Carrillo
*Attorney, Agent, or Firm*—Birch, Stewart, Kolasch & Birch, LLP

[57] ABSTRACT

The molecular composite material having excellent properties such as mechanical strength, heat resistance, solvent resistance, etc. is produced by (a) polymerizing an aromatic diaminodithiol compound, of which hydrogen atoms of thiol groups of aromatic diaminodithiol compound are substituted with substituted or unsubstituted alkyl groups, with a dicarboxylic acid derivative to form an aromatic polythiazole prepolymer, (b) dissolving the aromatic polythiazole prepolymer in an organic solvent to prepare a solution thereof; (c) adding a monomer of the matrix polymer to the solution to polymerize the monomer to the matrix polymer in the solution; (d) removing the organic solvent from a mixture of the aromatic polythiazole prepolymer and the matrix polymer; and (e) heating a mixture of the aromatic polythiazole prepolymer and the matrix polymer to cause a thiazole ring closure reaction of the aromatic polythiazole prepolymer.

5 Claims, 3 Drawing Sheets

AMOUNT OF POLYBENZOTHIAZOLE

FIG. 3

LASER BEAM-SCATTERING ANGLE (°)

FIG. 4

AMOUNT OF POLYBENZOTHIAZOLE

FIG. 5

AMOUNT OF POLYBENZOTHIAZOLE

MOLECULAR COMPOSITE MATERIAL INCLUDING AROMATIC POLYTHIAZOLE AND METHOD OF PRODUCING SAME

BACKGROUND OF THE INVENTION

The present invention relates to a method of producing a molecular composite material comprising aromatic polythiazole as a rigid polymer and a matrix polymer, which molecular composite material is suitable as a structural material for aircraft, automobiles, spacecraft, etc.

Recently, to achieve the reduction of weight of aircraft, automobiles, etc., plastic materials called "engineering plastics" having excellent mechanical properties, heat resistance, etc. have been increasingly used. Apart from this, development has been actively carried out to provide composite materials such as FRPs consisting of plastic materials and high-strength, high-modulus fibers such as carbon fibers, and these composite materials are being used in many applications.

It is known that the strength of these composite materials largely depend not only on the strength of plastics and reinforcing fibers but also on the interfacial bonding strength of the fibers to the matrix resins. Also, the impregnating capability of matrix resins into the fiber-reinforced preforms affect the easiness of production of composite materials and the strength of the resulting products. Accordingly, even though high-strength, high-modulus fibers and resins are used as starting materials, composite materials having excellent strength are not necessarily obtained.

Under such circumstances, to overcome the above problems, proposals have been made to develop high-strength polymer blend composites (molecular composite materials) by finely dispersing rigid polymers such as aromatic polyamides, etc. in matrix resins to a molecular level.

Aromatic polymers suitable for molecular composite materials include those containing heterocyclic repeating units such as thiazole rings, imidazole rings, oxazole rings, oxazinone rings, etc. Among them, aromatic polythiazole having a thiazole ring is highly promising because of its excellent mechanical strength.

In the meantime, the homogeneous dispersion of a reinforcing polymer in a matrix polymer cannot be achieved if the reinforcing polymer is simply blended with the matrix polymer. This means that simple blending fails to provide a molecular composite material having excellent mechanical properties. Therefore, various attempts have been made so far to avoid this difficulty.

For instance, Japanese Patent Laid-Open No. 1-287167 discloses a method of producing a polymer composite comprising the steps of introducing a polymer solution mainly containing (A) a reinforcing polymer consisting of polythiazole having a substantially rod-shaped skeleton and (B) a fusible matrix polymer into a solidification bath, and forming it into a film, the above polymer solution showing an optical anisotropy and being solidified via an apparent, optically isotropic phase after immersion in the solidification bath.

Japanese Patent Publication No. 2-7976 discloses a polymer composition comprising a reinforcing polymer A consisting of polythiazole having a substantially rod-shaped skeleton, and a matrix polymer B consisting of a less-crystallizable aromatic copolyamide having a glass transition temperature of 200° C. or higher and a flow-initiation temperature of 500° C. or lower, a weight ratio of A/(A+B) being 0.15–0.70. When the aromatic copolyamide is kept at a temperature between its glass transition temperature and its flow-initiation temperature for an arbitrary period of time within 5 hours, the resulting crystals have apparent sizes of 2.5 nm or less.

However, in the methods of producing polymer composites as disclosed in Japanese Patent Laid-Open No. 1-287167 and Japanese Patent Publication No. 2-7976, homogeneous dispersions of the reinforcing polymers in matrix polymers are not expected. This means that the resulting molecular composite materials do not show largely improved mechanical strength, etc. This appears to be due to the fact that the rigid reinforcing polymers and the matrix polymers do not show good compatibility with each other.

Thus, proposals have been made to provide a method of producing a molecular composite material of a rigid aromatic polymer, the method comprising the steps of homogeneously mixing a prepolymer of the rigid aromatic polymer and a matrix polymer or its prepolymer in an organic solvent, removing the organic solvent and then heating it so that the rigid aromatic polymer is formed from its prepolymer (Japanese Patent Laid-Open Nos. 64-1760 and 64-1761).

Another proposal has also been made to provide the method of producing a molecular composite material, in which hydrogen atoms of thiol groups of an aromatic polythiazole prepolymer are substituted with alkyl groups to enhance a dispersibility of the aromatic polythiazole in a solvent (Japanese Patent Laid-Open No. 4-114062). By the above methods, molecular composite materials having relatively good mechanical strength, etc. can be produced.

However, these molecular composite materials fail to show sufficiently high dispersibility of the aromatic polythiazole prepolymer in the matrix polymer. In addition, the production of these molecular composite materials needs such a long period of time as one week for completion of the dispersing process. The mechanical strength of the molecular composite materials obtained by using these conventional methods is still insufficient. Therefore, further improvement is desired to overcome the deficiencies described above.

OBJECT AND SUMMARY OF THE INVENTION

Accordingly, an object of the present invention is to provide a molecular composite material having excellent mechanical strength, etc., and a method of producing the molecular composite material, thereby eliminating the above problems.

As a result of intense research in view of the above object, the inventors have found that by dissolving an aromatic polythiazole prepolymer in an organic solvent and adding monomers of a matrix polymer to the solution of the aromatic polythiazole prepolymer to polymerize the monomer, a molecular composite material containing the aromatic polythiazole homogeneously dispersed in the matrix polymer can be obtained in a short period of time. The present invention has been completed based upon this finding. Thus, the method of producing a molecular composite material comprising aromatic polythiazole as a rigid polymer and a matrix polymer according to the present invention comprises the steps of:

(a) polymerizing an aromatic diaminodithiol compound, of which hydrogen atoms of thiol groups of aromatic diaminodithiol compound are substituted with substituted or unsubstituted alkyl groups, with a dicarboxylic acid derivative to form an aromatic polythiazole prepolymer, (b) dissolving the aromatic polythiazole prepolymer in an organic solvent to prepare a solution thereof;

(c) adding a monomer of the matrix polymer to the solution to polymerize the monomer to the matrix polymer in the solution;

(d) removing the organic solvent from a mixture of the aromatic polythiazole prepolymer and the matrix polymer; and (e) heating a mixture of the aromatic polythiazole prepolymer and the matrix polymer to cause a thiazole ring closure reaction of the aromatic polythiazole prepolymer.

The molecular composite material according to the present invention comprising aromatic polythiazole as a rigid polymer and a matrix polymer, a laser beam-scattering intensity of the molecular composite material being three times or less that of the matrix polymer at a scattering angle of 10°.

DETAILED DESCRIPTION OF THE INVENTION

The present invention will be explained in detail below.

First, the aromatic thiazole prepolymer compound used in the present invention is obtained by polymerizing alkyl group-substituted aromatic diaminodithiol with dicarboxylic acid.

The alkyl group-substituted aromatic diaminodithiol compound is synthesized from an aromatic diaminodithiol compound and an alkyl halide having substituted or unsubstituted alkyl groups. The aromatic diaminodithiol compound used in the form of a salt is a compound having amino groups and thiol groups on both sides of its aromatic residual group, and the aromatic residual group may be not only a benzene ring but also any aromatic ring in which 2 or more benzene rings are condensed. Further, the aromatic residual group may be those having 2 or more benzene rings bonded to each other, such as biphenyl. The amino groups and the thiol groups on both sides may be bonded to the aromatic residual group symmetrically with respect to its axis or its central point. Typical examples of such aromatic diaminodithiol compounds are:

etc.

These aromatic diaminodithiol compounds are used in the form of a salt such as a hydrochloride to prevent their deterioration.

The alkyl groups bonded to the thiol groups of the aromatic diaminodithiol compound are substituted or unsubstituted alkyl groups. The unsubstituted alkyl groups include an isopropyl group, an ethyl group, an n-propyl group, an n-butyl group, a sec-butyl group, a tert-butyl group, etc. Among them, secondary or tertiary alkyl groups are particularly preferable.

The substituted alkyl groups may be the above-described alkyl groups substituted with a carboxyl group, an ester group, a cyano group, a benzyl group, a halogen group, a nitro group, etc. Incidentally, in the case of having such substituent groups, the alkyl groups need not be secondary ones. The substituted alkyl groups include specifically:

etc.

Incidentally, with respect to the first two alkyl groups among the above six substituted alkyl groups, alkyl groups bonded to an oxygen atom in the ester bond need not be a methyl group, and they may be longer linear alkyl groups.

Particularly when the hydrogen atoms in the thiol groups of the aromatic diaminodithiol compound are substituted with an alkyl group having a cyano group or an ester group, the resulting prepolymer can be subjected to a ring closure reaction at a relatively low temperature of about 250°–350° C. In addition, the resulting prepolymer can be easily dissolved in an organic solvent such as N-methyl-2-pyrrolidone, etc.

By selecting an alkyl group having a proper length of a carbon chain (carbon number: about 2–5), the molecular composite materials having excellent physical and chemical properties can be produced as described below.

The above alkyl group is used in the form of a halide, namely an alkyl halide. The halides which may be used in the present invention are bromides, chlorides, iodides, etc. of the above alkyl groups.

The dicarboxylic acid derivatives used in the present invention include those having carboxylic groups substituted as follows:

etc.

The residual groups of the above dicarboxylic acid derivatives are preferably aromatic groups, and their specific examples are as follows:

etc.

Preferred among them is terephthalic acid. The dicarboxylic acid derivative may be used alone or in combination.

The aromatic polythiazole prepolymer obtained by polymerizing the alkyl group-substituted aromatic diaminodithiol compound and the dicarboxylic acid derivative may have the following structure;

wherein $Ar_1$ and $Ar_2$ represent aromatic residual groups.

The matrix polymers usable in the present invention include aramide resins, polyether sulfones, polyetherimides, polyimides, polyimidethiazoles, polyamideimides, etc. Preferred among them are polyimides such as thermoplastic polyimides, thermosetting polyimides, polyimidethiazoles and so on. Especially preferred are aromatic polyimidethiazoles. Since these resins have excellent compatibility with the aromatic polythiazole prepolymer, they can provide molecular composite materials with excellent mechanical strength.

According to the present invention, monomers of the matrix polymer are added to a solution of the aromatic polythiazole prepolymer so that they are polymerized to form a matrix polymer in the aromatic polythiazole prepolymer. For instance, in case the matrix polymer to be obtained is a polyimide such as a thermoplastic polyimide, a thermosetting polyimide, polyimidethiazole, etc., a combination of a diamine compound and an acid anhydride is used.

Preferred diamine compounds are as follows:

etc.

Preferred acid anhydrides are as follows:

etc.

Next, the production of the molecular composite material will be described below.

The aromatic polythiazole prepolymer may be produced in a known manner, for instance, by the following steps.

(1) Reacting the aromatic diaminodithiol compound salt with an alkyl halide in an alkaline aqueous solvent, so that hydrogen atoms in thiol groups of the aromatic diaminodithiol compound are substituted with the alkyl group; and (2) Polymerizing the monomer obtained in the step (1) with the dicarboxylic acid derivative to form an aromatic polythiazole prepolymer.

The above steps will be explained below.

In the step (1), the alkaline aqueous solvent used may be water or a mixture of water and alcohol (ethanol and/or methanol) in which an alkaline salt such as sodium hydroxide is dissolved. Incidentally, the alkali concentration in the alkaline aqueous solvent is preferably 30 weight % or less. The substitution reaction can be conducted at a temperature of 0°–100° C. The reaction time is not specifically restricted, but it is generally about 2–24 hours. Incidentally, to accelerate the substitution reaction, the solution is preferably stirred. Also, by using an excess amount of an alkyl halide and phase transfer catalyst, the reaction rate can be increased.

By conducting the substitution reaction under the above conditions, the hydrogen atoms in the thiol groups of the aromatic diaminodithiol compound salt can be substituted with the alkyl groups.

In the step (2), solvents such as N-methyl-2-pyrrolidone, hexamethyl phosphoric triamide, N,N-dimethylacetamide, etc. may be used alone or in combination. To increase solubility, chlorides such as LiCl, $CaCl_2$, etc. may be added in an amount up to 10%.

The monomer obtained in the step (1) and the dicarboxylic acid derivative are dissolved in the above solvent at an equimolar ratio, and subjected to a polymerization reaction at a temperature between −20° C. and +50° C. The monomer concentration is preferably about 0.1–2 mol/l. When the monomer concentration exceeds 2 mol/l, the monomer cannot completely be dissolved. The solution is preferably stirred to increase the polymerization reaction rate. The polymerization reaction time is not particularly restricted, but it is generally about 1–24 hours.

By the polymerization reaction under the above conditions, the aromatic polythiazole prepolymer having a large polymerization degree can be obtained without causing a ring closure reaction. The resulting aromatic polythiazole prepolymer may be washed and dried by a known method.

The aromatic polythiazole prepolymer obtained by the method as described above is then dissolved in an organic solvent. The organic solvents which may be used include N-methyl-2-pyrrolidone, dimethylsulfoxide, N,N-dimethylacetamide, etc. A concentration of the resultant solution is preferably about 3 to 7 weight %. The dissolving temperature is preferably about 20 to 90° C.

Subsequently, monomers of the matrix polymer are dissolved in the solution of the aromatic polythiazole prepolymer, and polymerized therein to form the matrix polymer. The polymerization reaction is preferably carried out at a temperature of 25° C. to 80° C. for 3 hours to 24 hours. In case polyimide is used as the matrix polymer, either one component of a diamine compound and an acid anhydride which are monomers of the polyimide is first added to the solution and dissolved therein for 0.5 hours to 24 hours, and the other component is then added to the solution to polymerize these monomers.

The aromatic polythiazole prepolymer and the monomers of the matrix polymer may be dissolved in an organic solvent by any method as long as a homogeneous solution or slurry is produced. The polymerization of the monomers of the matrix polymer in the aromatic polythiazole prepolymer solution may be carried out preferably in an atmosphere of an inert gas such as a nitrogen gas, an argon gas, etc. or in vacuum.

After the polymerization of the monomers of the matrix polymer, the organic solvent is evaporated to dry the polymerized product. This evaporation step is preferably carried out after a film or a yarn is formed by a casting method. Since a solution of the prepolymer substituted with alkyl groups shows a large liquid crystal property, it is easy to form yarns from a solution of the prepolymer and the matrix polymer in an organic solvent. Incidentally, to increase the liquid crystal property of the prepolymer, it is preferable that the alkyl groups bonded to the thiol groups are long. Actually, by taking into consideration the weight loss, etc. of the prepolymer by heating, the alkyl groups having proper length are preferably used.

The composite of the aromatic polythiazole prepolymer and the matrix polymer may be dried by a known method.

Next, the above composite of the aromatic polythiazole prepolymer and the matrix polymer is heated, so that a thiazole ring closure reaction takes place in the prepolymer to obtain a molecular composite material. By this heat treatment, the alkyl group (R) is removed from the prepolymer, thereby forming a thiazole ring at that site. As a result, an aromatic polythiazole can be produced. When the aromatic polythiazole prepolymer is used as a prepolymer, the poly-p-phenylenebenzobisthiazole having the following structure can be obtained.

A homogeneous mixture of the prepolymer and the matrix polymer is heated at 250°–400° C., within which range an actual heating temperature may vary depending on the types of the matrix polymer used. When the heating temperature is lower than 250° C., the thiazole ring cannot be formed. On the other hand, when heated at a temperature exceeding 500° C., the polythiazole is likely to be thermally decomposed.

When a polyimide is used as a matrix polymer, an imide ring closure reaction takes place in the process of a thiazole ring closure reaction of the aromatic polythiazole prepolymer. Particularly, when a polyimidethiazole is used as a matrix polymer, both an imide ring closure reaction and a thiazole ring closure reaction take place in the matrix polymer.

The heating of the mixture of the prepolymer and the matrix polymer can be conducted at a constant temperature, and it may also be conducted according to a heating program in which a heating temperature is changed stepwise. One example of such a heating program may be a stepwise temperature-elevating process comprising keeping at 120° C. for 30 minutes, heating from 120° C. to 350° C. over 30 minutes, and then keeping at 350° C. for 30 minutes.

With respect to the proportion of the aromatic polythiazole in the composite material, the aromatic polythiazole component may be included in an extremely small amount to achieve reinforcement, but the proportion of the aromatic polythiazole is preferably in the range of 0.1 to 70 weight % on the basis of the total amount of the polymers (the aromatic polythiazole plus the matrix polymer). When the amount of the aromatic polythiazole serving as a reinforcing polymer is too large, it is so dense in the resulting molecular composite material that the aromatic polythiazole molecules undesirably tend to gather together to form clusters, making the dispersion of the aromatic polythiazole poor at a molecular level. Accordingly, the resulting molecular composite material has a poor mechanical strength. The more preferred proportion of the aromatic polythiazole is in the range of 1 to 20 weight % on the basis of the total amount of the polymers. The most preferred proportion of the aromatic polythiazole is in the range of 1 to 10 weight %.

The proportion of the aromatic polythiazole to the matrix polymer may vary depending upon a combination of starting materials used. Generally, if the larger proportion of the aromatic polythiazole is employed, the higher mechanical properties, particularly tensile modulus of the final molecular composite material is obtained. However, when the concentration of the aromatic polythiazole exceeds a certain level, the molecular composite material produced suffers from considerable deterioration of its mechanical properties, especially tensile modulus as well as the reduction of its transparency. This is caused by a poor dispersion of the aromatic polythiazole in the molecular composite material. A laser beam-scattering intensity measured at a scattering angle of 10° can be used as an index of the dispersion of the aromatic polythiazole in the molecular composite material produced. A lower value of the laser beam-scattering intensity indicates an excellent homogeneity of the molecular composite material, while a higher value thereof indicates a poor homogeneity of the molecular composite material.

The molecular composite material according to the present invention has a laser beam-scattering intensity three times or less that of the matrix polymer at a scattering angle of 10°. When the scattering intensity of the molecular composite material exceeds three times that of the matrix polymer, the dispersion of the aromatic polythiazole in the molecular composite material is poor, meaning that the molecular composite material is provided with poor mechanical strength. For instance, in the case of using poly-p-phenylenebenzothiazole as the aromatic polythiazole and polyimide (Kapton) as the matrix polymer, when the proportion of the aromatic polythiazole exceeds 10 weight %, the resulting molecular composite material has the laser beam-scattering intensity (at a scattering angle of 10°) three times or more that of Kapton, which indicates poor dispersion and low transparency of the molecular composite material. On the other hand, if the proportion of the aromatic polythiazole is less than 1 weight %, the molecular composite material has an insufficient mechanical strength. In this case, it is preferred that the proportion of the aromatic polythiazole in the molecular composite material be in the range of 1 to 10 weight %.

Since the aromatic polythiazole prepolymer homogeneously dispersed in the matrix polymer at a molecular level is converted to an aromatic polythiazole by the above method, excellent dispersion of the aromatic polythiazole in the matrix polymer to a molecular level can be achieved. This eliminates the problem of poor mechanical strength due to insufficient bonding strength in the interfaces between the aromatic polythiazole molecules and the matrix polymer molecules. Thus, the molecular composite material having excellent mechanical properties can be obtained.

According to the present invention, by carrying out a polymerization reaction of monomers of a matrix polymer in a solution of an aromatic polythiazole prepolymer in an organic solvent, a homogeneous dispersion of the aromatic polythiazole in the matrix polymer can be achieved, resulting in an enhanced mechanical strength of the molecular composite material.

Since monomers of the matrix polymer are polymerized in the solution containing the aromatic polythiazole prepolymer, any stirring and dispersing steps which would take several days in conventional methods can be omitted. Furthermore, in view of the fact that the dispersing step is conducted in a solution containing monomers of the matrix polymer, the concentration of the reaction mixture solution can advantageously be increased, thereby reducing the amount of the solvent.

The present invention will be described in further detail by way of the following Examples without intention of restricting the scope of the present invention.

EXAMPLE 1

0.7570 g of a polybenzothiazole prepolymer (hereinafter referred to as "PBT prepolymer") having the structure shown below and having an intrinsic viscosity $\eta_{inh}$ of 1.5 dl/g at a concentration of 0.5 g/dl was dissolved in 63 ml of N-methyl-2-pyrrolidone (hereinafter referred to as "NMP") at room temperature, and 4.4791 g (22.3687 mmol) of 4,4'-aminophenylether was added to the resulting solution while stirring.

2 hours after the addition of 4,4'-aminophenylether, 4.8791 g (22.3687 mmol) of pyromellitic acid anhydride was added to the resulting solution while stirring to cause a polymerization reaction between 4,4'-aminophenylether and pyromellitic acid anhydride at room temperature for 6 hours.

The resulting solution was cast on a glass plate at a thickness of 0.5 mm by using a doctor blade to obtain a cast film. The film was placed in a desiccator and dried in vacuum for one night long. Thereafter, the film was heat-treated at 100° C. for one hour, at 250° C. for one hour and at 340° C. for one hour. As a result, the film of the molecular composite material containing 5 weight % of PBT on the basis of the total polymer amount was obtained.

Figure 1:
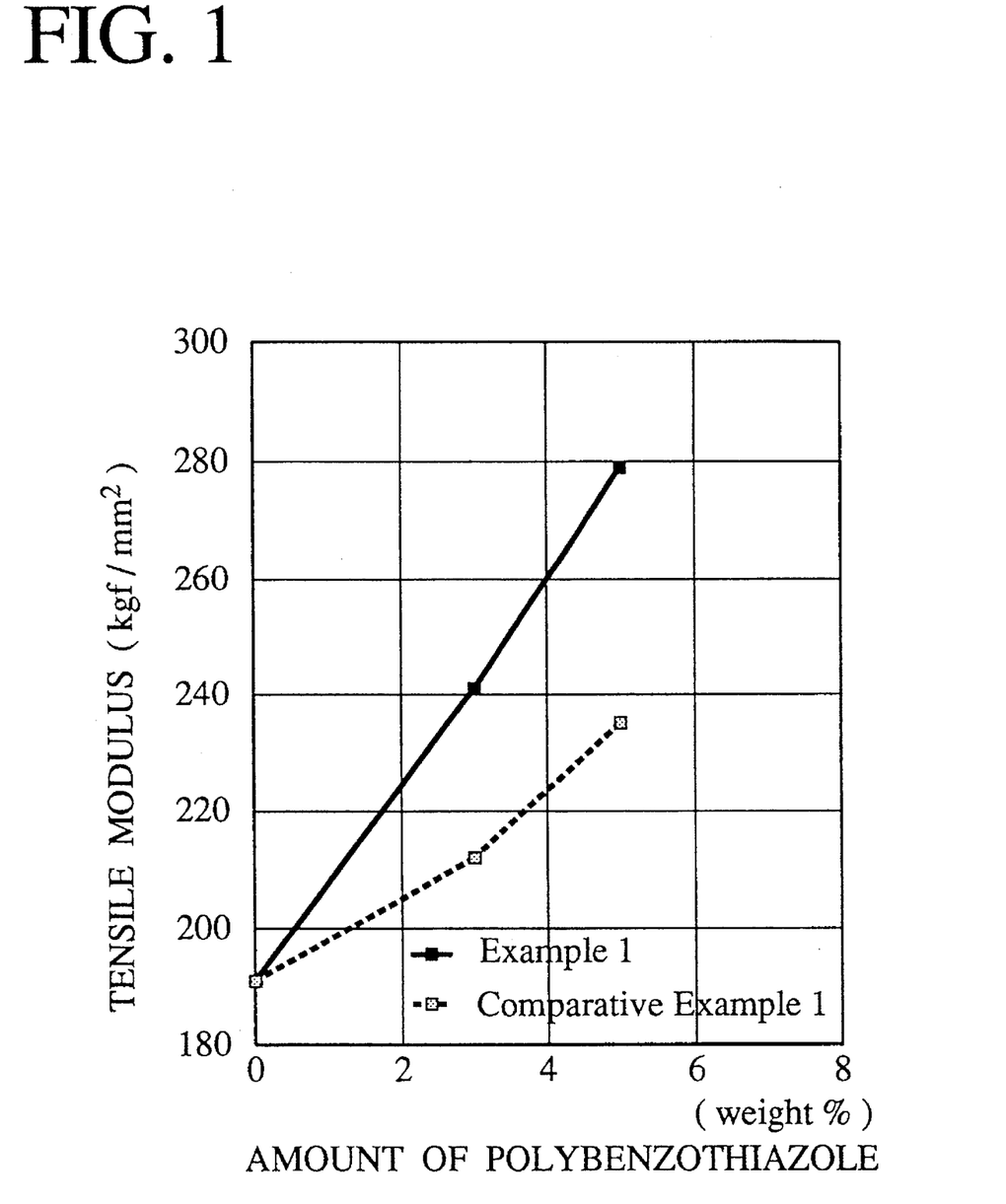
FIG. 1 is a graph showing the relation between tensile modulus and the amount of polybenzothiazole with respect to molecular composite material samples of Example 1 and Comparative Example 1.

Using the same starting materials and the same method as described above, another film of a molecular composite material containing 3 weight % of PBT was obtained. The two films obtained were then subjected to a measurement of tensile modulus according to JIS K7127. The results are shown in FIG. 1.

COMPARATIVE EXAMPLE 1

4.4791 g (22.3687 mmol) of 4,4'-aminophenylether was dissolved in 60 ml of NMP, and 4.8791 g (22.3687 mmol) of a pyromellitic acid anhydride was added to the resulting solution which was then subjected to a polymerization reaction at 25° C. for 3 hours to synthesize a polyamic acid as a matrix polymer. The solution of the synthesized polyamic acid was further diluted with NMP to obtain a 10-weight-% solution of polyamic acid in NMP (solution I). Separately, 0.7570 g of the same polybenzothiazole prepolymer as in Example 1 was added to 45 ml of NMP to prepare a solution II. The solutions I and II were mixed to prepare two types of mixture solutions having PBT contents of 3 weight % and 5 weight %, respectively based on the total polymers. Each of the mixture solutions was mixed for one week in an argon gas atmosphere while intermittently stirring to produce a homogeneous solution.

Using the same method as in Example 1, two films were obtained from the two homogeneous solutions. A film made of the matrix polymer only was separately prepared. The three types of the films thus obtained were subjected to measurements of tensile modulus in the same manner as in Example 1. The results are also shown in FIG. 1. As is apparent from FIG. 1, the molecular composite material of Example 1 according to the present invention, exhibit higher tensile modulus and higher PBT dispersibility as compared with Comparative Example 1.

EXAMPLE 2

0.0841 g of the same PBT prepolymer as in Example 1 was dissolved in 7 ml of NMP at room temperature. 0.5854 g (2.0025 mmol) of 1,4-bis(4-aminophenoxy)benzene having the following structure was added to the resulting solution while stirring.

2 hours after the addition of 1,4-bis(4-aminophenoxy)benzene, 0.4368 g (2.0025 mmol) of pyromellitic acid anhydride was added to the solution to cause a polymerization reaction between the diamine compound and the acid anhydride at room temperature for 6 hours.

The resulting solution was cast on a glass plate at a thickness of 0.5 mm using a doctor blade to produce a film. The film was placed in a desiccator and dried in vacuum for one night long. Thereafter, the film was heat-treated at 100° C. for one hour, at 250° C. for one hour and at 340° C. for one hour, respectively in vacuum to obtain a film of a molecular composite material having a PBT content of 5 weight %.

Figure 2:
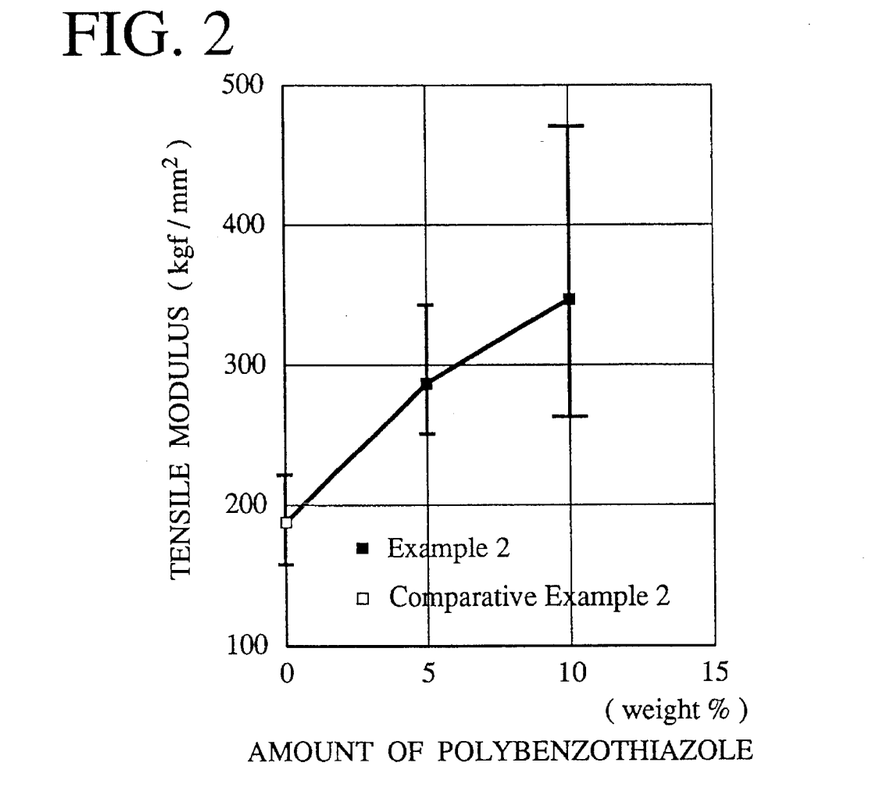
FIG. 2 is a graph showing the relation between tensile modulus and the amount of polybenzothiazole with respect to a molecular composite material sample of Example 2 and a sample of Comparative Example 2.

In the same manner as described above, another film of a molecular composite material having a PBT content of 10 weight % was obtained. Two types of the films thus obtained were subjected to a measurement of tensile modulus using the same method as in Example 1. The results are shown in FIG. 2.

COMPARATIVE EXAMPLE 2

Using only the matrix polymer of Example 2, a film was formed in the same manner as in Example 2. Also, the tensile modulus was measured in the same manner as in Example 2. The results are also shown in FIG. 2. As is apparent from FIG. 2, the molecular composite material of Example 2 containing an aromatic polythiazole dispersed in a matrix polymer has higher tensile modulus than that of Comparative Example 2 made of the matrix polymer only.

EXAMPLE 3

Using the same starting materials and method as in Example 1, two films of molecular composite materials having PBT contents of 0 weight %, 5 weight % and 8 weight %, respectively, were prepared and subjected to a measurement of a laser beam-scattering intensity by a laser beam-scattering photometer (RS-3 manufactured by Optic K.K.). The results are shown in FIG. 3.

COMPARATIVE EXAMPLE 3

Using the same starting materials and method as in Example 3, a film of a molecular composite material having a PBT content of 20 weight % was prepared and subjected to a measurement of a laser beam-scattering intensity by a laser beam-scattering photometer (RS-3 manufactured by Optic K.K.). The results are shown in FIG. 3.

Figure 3:
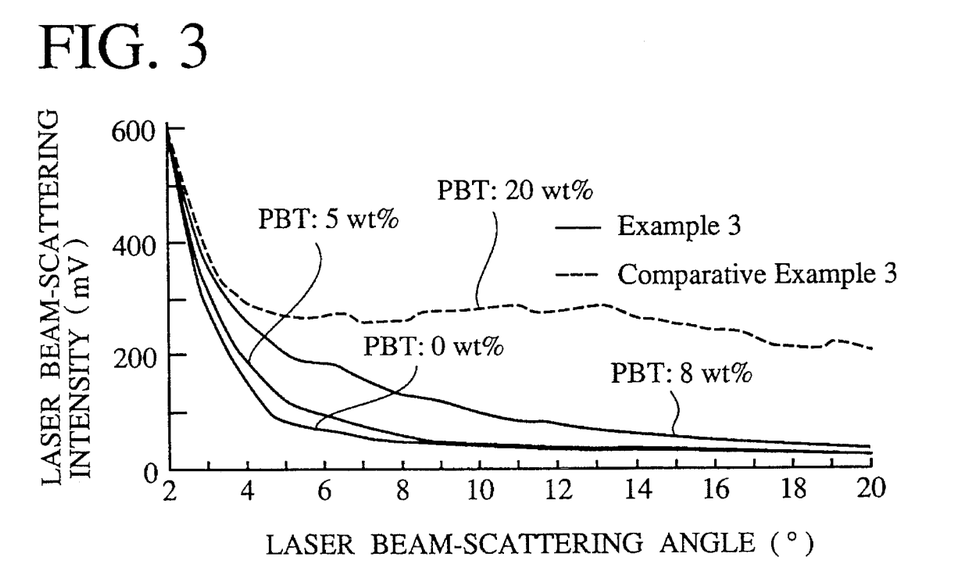
FIG. 3 is a graph showing the relation between laser beam-scattering intensity and laser beam-scattering angle with respect to molecular composite material samples of Example 3 and Comparative Example 3.

As is apparent from FIG. 3, the film of Example 3 having a PBT content of 10 weight % or less has a low laser beam-scattering intensity as compared with that of the film made of the matrix polymer only. Regarding the laser beam-scattering intensity measured at a scattering angle of 10°, the value of the former film is three times or less that of the latter film. On the other hand, the film of Comparative Example 3 having a PBT content of 20 weight % has a considerably large laser beam-scattering intensity, its laser beam-scattering intensity at a scattering angle of 10° being more than three times that of the film made of the matrix polymer only.

EXAMPLE 4

0.2526 g of a PBT prepolymer having the following structure and having an intrinsic viscosity $\eta_{inh}$ of 1.5 dl/g (0.5 g/dl) was dissolved in 5 ml of NMP at room temperature.

Added to the resulting solution was 0.7653 g (2.0436 mmol) of 2,6-diaminophenylenebenzothiazole (hereinafter referred to as "DAPBT") having the following formula.

The resultant slurry was heated to 70° C. in an oil bath to dissolve DAPBT therein. Thereafter, 0.6585 g (2.0436 mmol) of benzophenonetetracarboxylic acid anhydride (hereinafter referred to as "BTDA") having the following formula was added to the slurry which was then subjected to a polymerization reaction at room temperature for 15 hours.

The resulting solution was cast on a glass plate to produce a film, and the film was placed in a water bath to remove a solvent therefrom. After removal of the solvent, the film was dried at 80° C. for one hour in vacuum to remove water adsorbed thereto, and then heat-treated at 100° C. for one hour, at 250° C. for one hour and at 330° C. for one hour, respectively, to obtain a film of a molecular composite material having a PBT content of 10 weight %.

Figure 4:
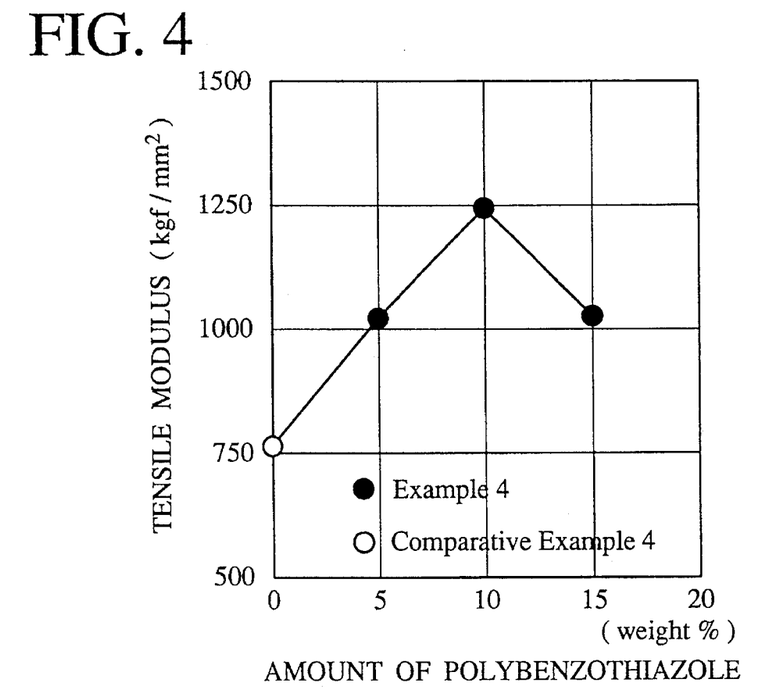
FIG. 4 is a graph showing the relation between tensile modulus and the amount of polybenzothiazole with respect to a molecular composite material sample of Example 4 and a sample of Comparative Example 4.
Figure 5:
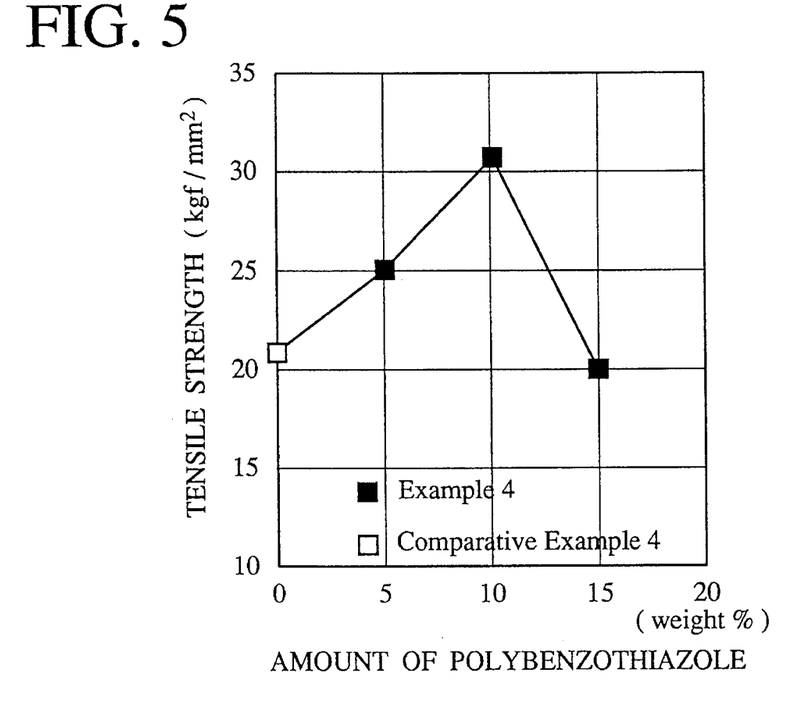
FIG. 5 is a graph showing the relation between tensile strength and the amount of polybenzothiazole with respect to a molecular composite material sample of Example 4 and a sample of Comparative Example 4.

Separately, using the same starting materials and the same method as described above, two films of molecular composite materials having PBT contents of 5 weight % and 15 weight %, respectively, were prepared. The three types of the films thus obtained were subjected to a tensile test in the same manner as in Example 1. The measurement results of tensile modulus and tensile strength are shown in FIGS. 4 and 5, respectively.

COMPARATIVE EXAMPLE 4

In the same manner as in Example 4, a film was produced using only the matrix polymer. The film was then subjected to the same tensile test as in Example 4. The test results are also shown in FIGS. 4 and 5. As is apparent from FIGS. 4 and 5, the films of Example 4 containing the dispersed aromatic polythiazole are excellent in both tensile modulus and tensile strength as compared with that obtained in Comparative Example 4 containing the matrix polymer only.

As described above in detail, since an aromatic polythiazole is dispersed in a matrix polymer by polymerizing monomers of the matrix polymer in a solution containing the aromatic polythiazole prepolymer according to the present invention, a molecular composite material having polybenzothiazole well dispersed in a matrix polymer and showing an excellent mechanical strength is obtained. The molecular composite materials obtained according to the present invention have excellent properties such as mechanical strength, heat resistance, solvent resistance, etc., so that they can be used widely for automobile parts, aircraft parts, space equipment, etc.

What is claimed is:

1. A method of producing a molecular composite material comprising 1–10 weight % based on the total amount of polymers, of aromatic polythiazole as a rigid polymer and a matrix polymer, said molecular composite material having a laser beam-scattering intensity three times or less than that of said matrix polymer at a scattering angle of 10°, said method comprising the steps of:

(a) polymerizing an aromatic diaminodithiol compound, the hydrogen atoms of the thiol groups of said aromatic diaminodithiol compound being substituted with substituted or unsubstituted alkyl groups, with a dicarboxylic acid derivative to form an aromatic polythiazole prepolymer in an organic solvent, (b) adding a monomer or monomers of said matrix polymer to a solution of said aromatic polythiazole prepolymer to polymerize said monomer to said matrix polymer;

(c) removing said organic solvent from said mixture of said aromatic polythiazole prepolymer and said matrix polymer by placing said mixture in water; and (d) heating said mixture of said aromatic polythiazole prepolymer and said matrix polymer to cause a thiazole ring closure reaction of said aromatic polythiazole prepolymer.

2. The method of producing a molecular composite material according to claim 1, wherein said dicarboxylic acid derivative is an aromatic dicarboxylic acid derivative.

3. The method of producing a molecular composite material according to claim 1, wherein said matrix polymer is polyimide.

4. A method of producing a molecular composite material comprising 1–10 weight % based on the total amount of polymers, of aromatic polythiazole as a rigid polymer and a matrix polymer selected from the group consisting of aramide resins, polyether sulfones, polyetherimides, polyimides, polyimidethiazoles and polyamideimides, said molecular composite material having a laser beam-scattering intensity three times or less that of said matrix polymer at a scattering angle of 10°, said method comprising the steps of:

(a) polymerizing an aromatic diaminodithiol compound, the hydrogen atoms of the thiol groups of said aromatic diaminodithiol compound being substituted with alkyl groups which may have substituent groups selected from the group consisting of a carboxyl group, an ester group, a cyano group, a benzyl group, a halogen group and a nitro group, with a dicarboxylic acid derivative to form an aromatic polythiazole prepolymer in an organic solvent, (b) adding a monomer or monomers of said matrix polymer to a solution of said aromatic polythiazole prepolymer to polymerize said monomer to said matrix polymer;

(c) removing said organic solvent from said mixture of said aromatic polythiazole prepolymer and said matrix polymer; and (d) heating said mixture of said aromatic polythiazole prepolymer and said matrix polymer to cause a thiazole ring closure reaction of said aromatic polythiazole prepolymer.

5. A method of producing a molecular composite material comprising 1–10 weight % based on the total amount of polymers, of aromatic polythiazole as a rigid polymer and polyimide as a matrix polymer, said molecular composite material having a laser beam-scattering intensity three times or less that of said polyimide at a scattering angle of 10°, said method comprising the steps of:

(a) polymerizing an aromatic diaminodithiol compound, the hydrogen atoms of the thiol groups of said aromatic diaminodithiol compound being substituted with alkyl groups which may have substituent groups selected from the group consisting of a carboxyl group, an ester group, a cyano group, a benzyl group, a halogen group and a nitro group, with a dicarboxylic acid derivative to form an aromatic polythiazole prepolymer in an organic solvent, (b) adding a diamine compound and a tetracarboxylic acid anhydride as monomers of said polyimide to a solution of said aromatic polythiazole prepolymer to polymerize said monomers to said polyimide;

(c) removing said organic solvent from said mixture of said aromatic polythiazole prepolymer and said polyamide; and (d) heating said mixture of said aromatic polythiazole prepolymer and said polyimide to cause a thiazole ring closure reaction of said aromatic polythiazole prepolymer.

\* \* \* \* \*